UNITED STATES PATENT OFFICE.

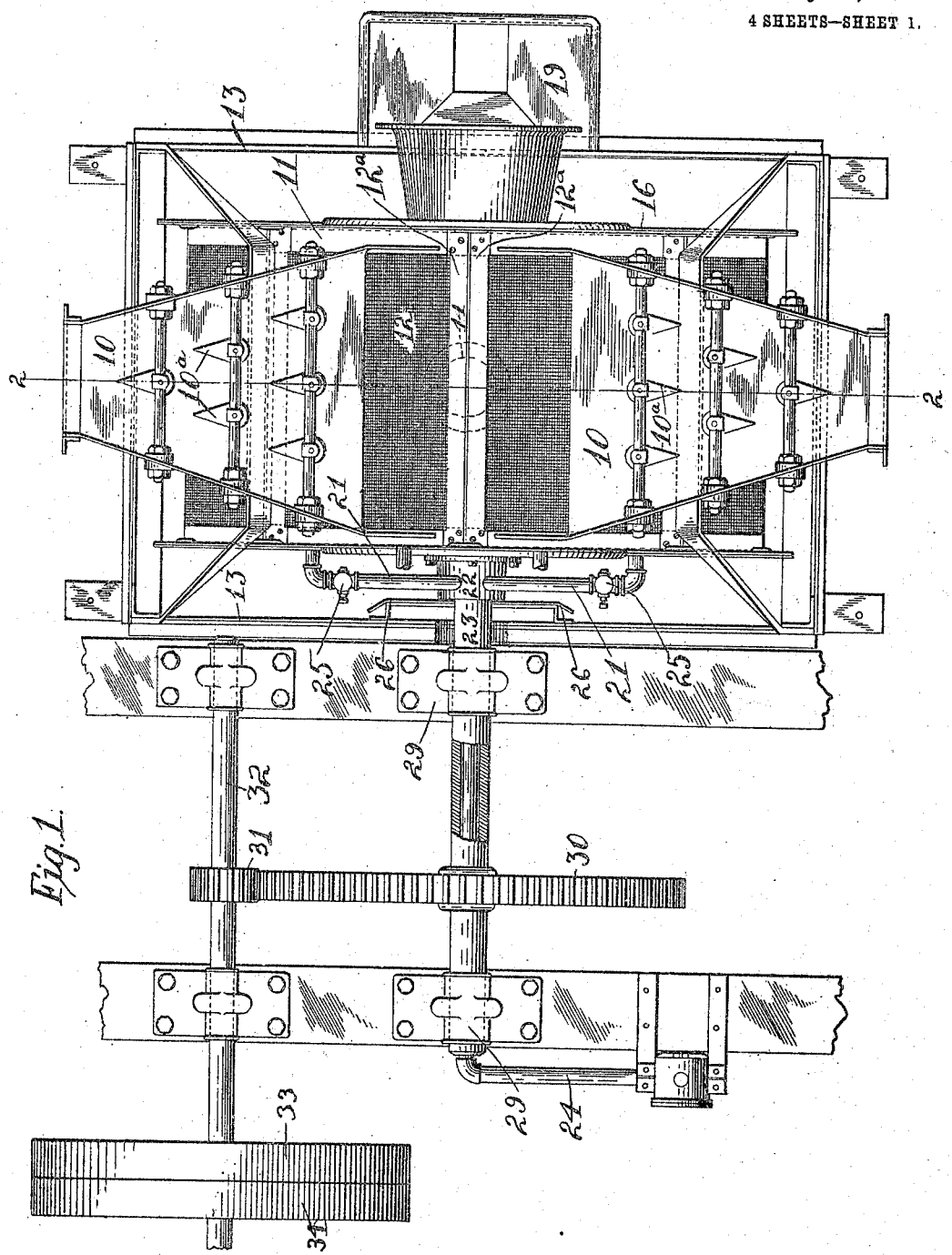

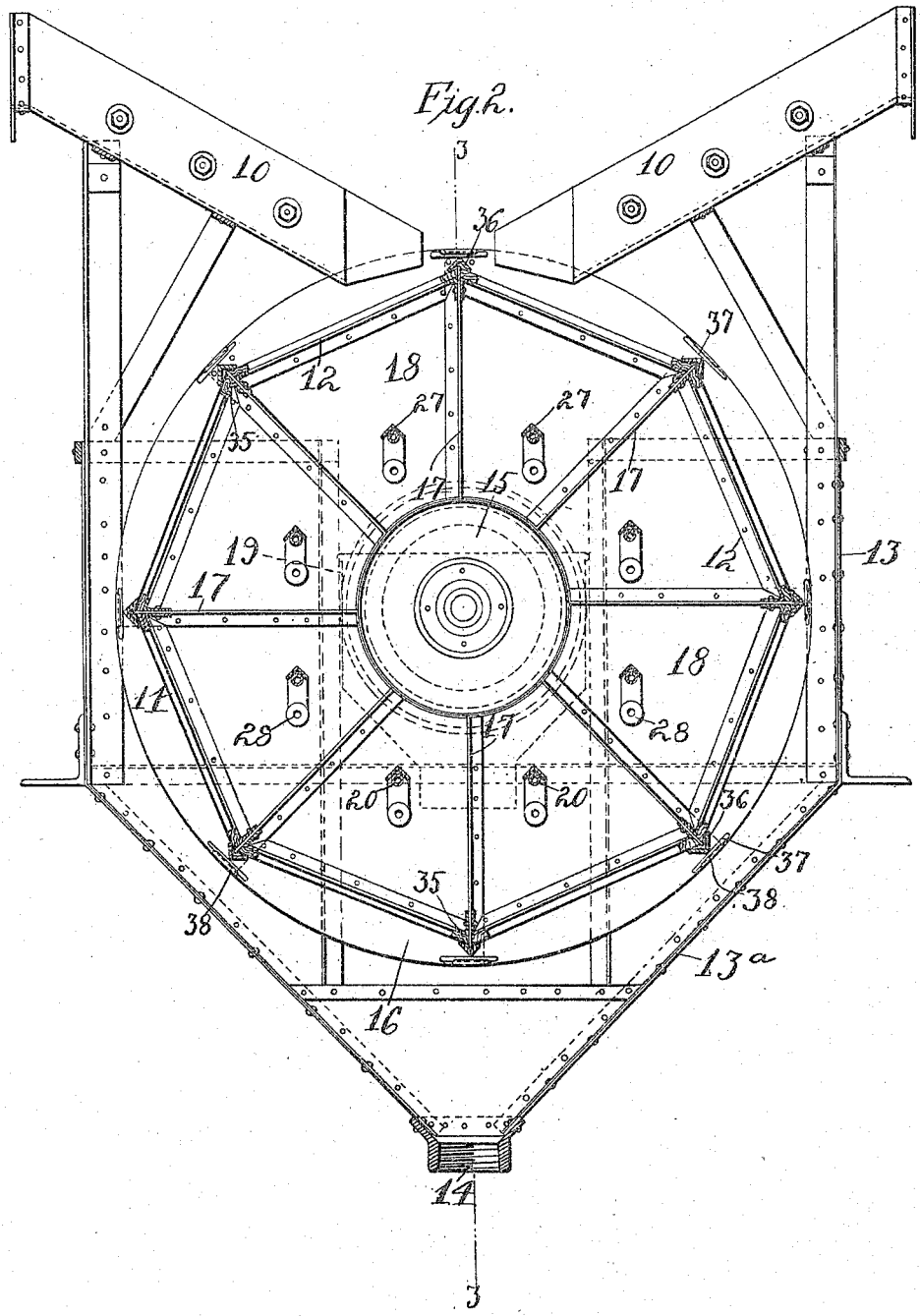

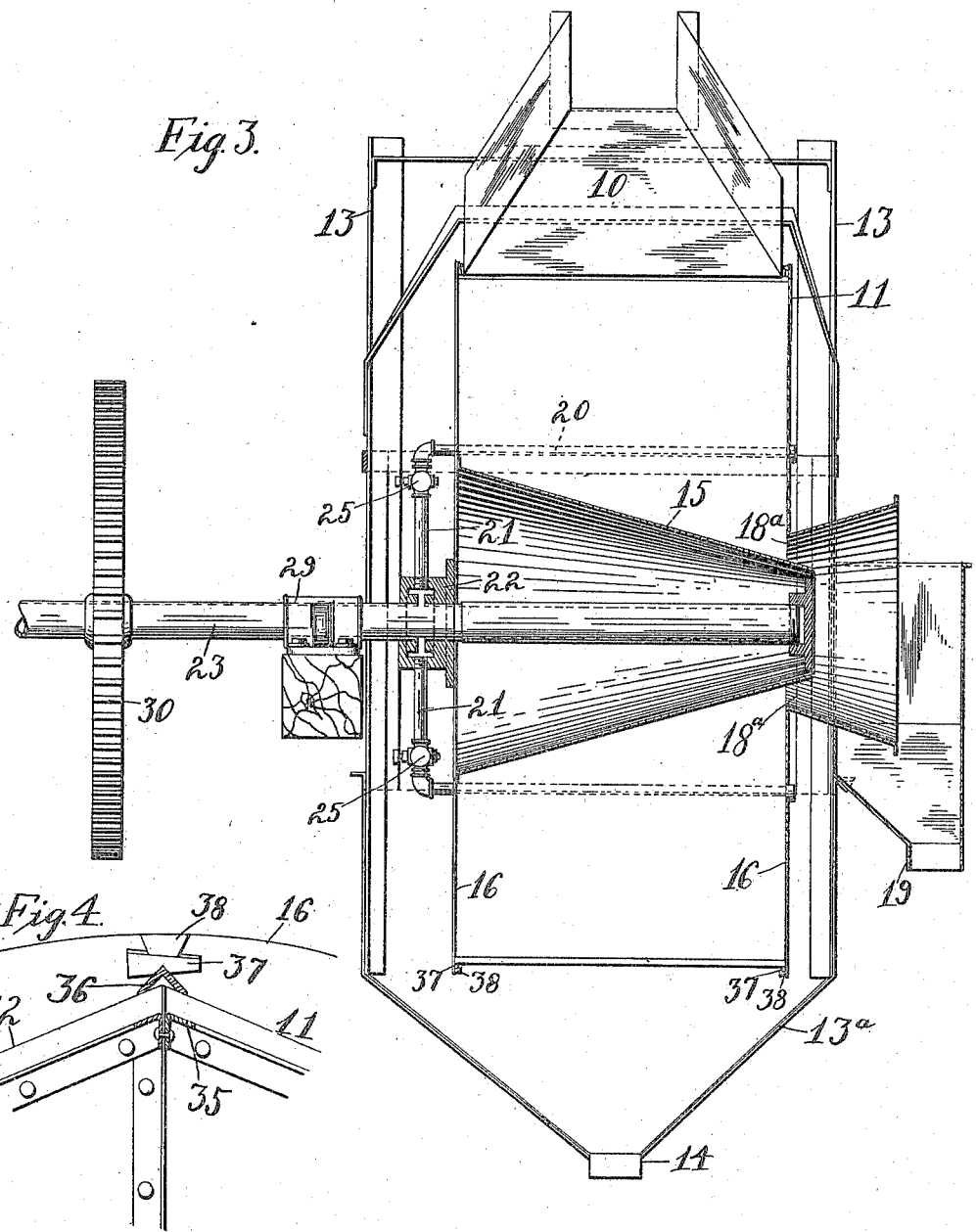

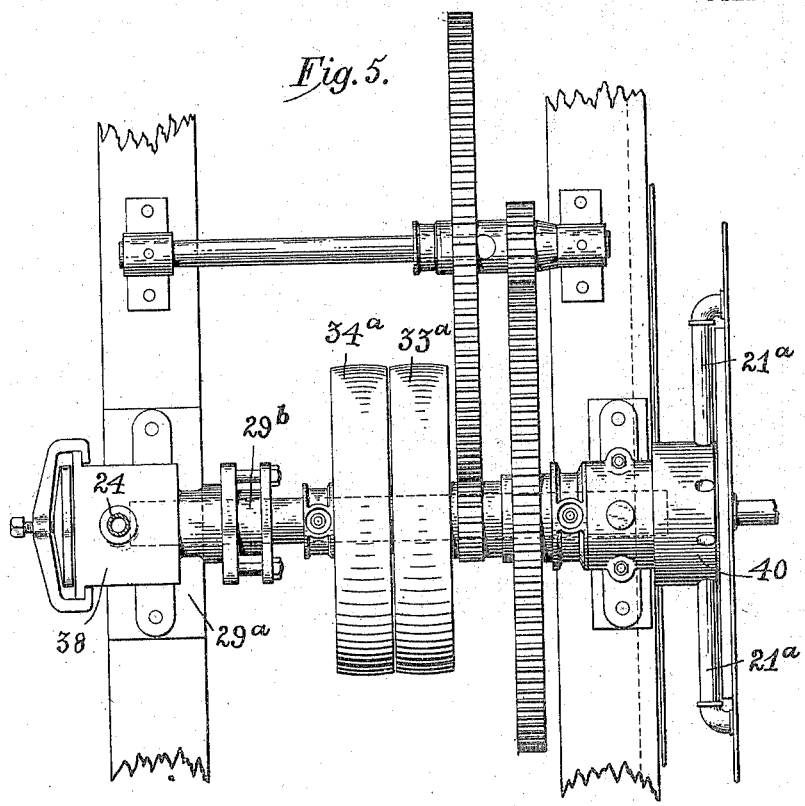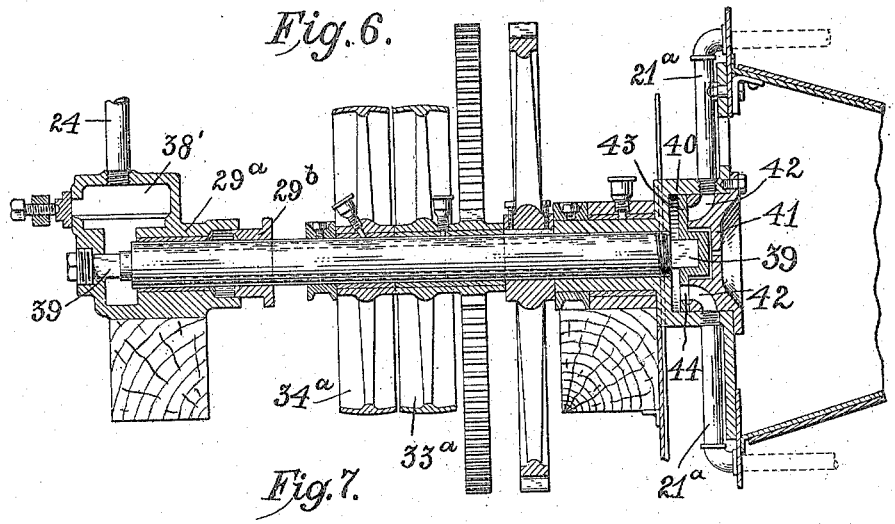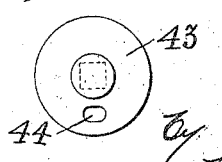

SAMUEL W. TRAYLOR, OF ALLENTOWN, PENNSYLVANIA.

ROTARY SCREEN.

957,818.  Specification of Letters Patent.  Patented May 10, 1910.

Application filed December 22, 1908. Serial No. 468,790.

*To all whom it may concern:*

Be it known that I, SAMUEL W. TRAYLOR, a citizen of the United States, residing at Allentown, Pennsylvania, have invented certain new and useful Improvements in Rotary Screens, of which the following is a specification.

My invention relates to improvements in rotary screens designed more especially for screening ores.

One object of the invention is to provide an exceedingly simple, economical, durable and efficient rotary screen, including in its construction a plurality of screen sections which may be readily secured to the carrying frame and as easily removed and replaced.

A further object is to provide efficient means for spraying the internal surfaces of the screen sections to free them from the material being operated upon so that the feed to the screen will continuously run on to a clean surface, thereby securing maximum efficiency.

I have also aimed to provide simple and efficient valve mechanism for securing the automatic control of the water supply; and means for preventing the clogging of the openings in the spray pipe.

With these and other objects in view, the invention comprises the various features of construction and arrangement and combination of parts hereinafter described and particularly set forth in the appended claims.

An embodiment of my invention is illustrated in the accompanying drawings in which,—

Figure 1 is a plan view of the screen. Fig. 2 is a section on line 2—2 of Fig. 1. Fig. 3 is a section on line 3—3 of Fig. 2. Fig. 4 is a detail view. Figs. 5, 6 and 7 are detail views of modifications.

Referring by reference characters to these figures, I have shown at 10, 10 two chutes or distributers as representative of any suitable means for feeding the ore to be screens or separated, the chutes being preferably provided with fingers $10^a$ to secure the uniform feeding or distributing of the ore. From these chutes the ore drops upon the exterior surface of a rotary screen 11 having a plurality of flat screen members or sides as indicated at 12, eight of these members or sides being shown as a convenient number, making the screen drum of octagonal form. This drum is rotatably mounted, in the manner hereinafter more particularly described, within a suitable casing 13, the lower part of which is tapered or contracted as shown at $13^a$, and which forms an oversize receiving hopper which discharges through the outlet opening 14 at its lower end.

The drum comprises a conical central portion or member 15, side plates 16, and transverse radial webs 17 connecting the side plates and extending inward to the central cone, these parts being conveniently made of sheet metal with abutting flanges or portions riveted or otherwise suitably secured together. These radial webs, with the side plates, provide a plurality of compartments, one for each screen, as indicated at 18 and each has a discharge opening $18^a$ in the side plate at the smaller end of the cone shaped member, communicating with a discharge hopper or collector 19.

As the material from the feed chutes falls on the screen surfaces, which are successively presented in the rotation of the screen the undersize or "through" product passes through each screen into the compartments beneath and falling on the inclined surfaces of the central cone flows outwardly through the lateral opening into the discharge hopper or collector 19.

By dividing up the interior of the drum into a plurality of compartments by the radial partitions, the undersize or through product is prevented from rolling directly around the cone 15 and thus dropping back again on to the inner surface of that portion of the rotary screen which is below the cone, it being confined against the cone by the radial walls thus developed laterally outward at the inclination of the cone before that portion of the cone has reached an inverted position.

The oversize material, or that which does not pass through the screen, but remains on the outside surface, is carried over into the lower portion of the casing or hopper where it tends to drop off, though more or less of it will adhere to the surface of the screen.

To effectually clear the meshes from this oversized material, means are provided for spraying water against the inner surface of each screen section by the time it has reached the lower portion of the casing. A very desirable means for accomplishing this is to provide a pipe 20 extending longitudinally within each compartment 18 and provided with suitable perforations so as to discharge a spray water through the meshes of the screen from the inner side. Each of these pipes 20 on the outside is provided with an inwardly extending branch 21 leading to a collar 22 secured to the supporting shaft 23 of the drum. This supporting shaft is hollow so as to permit the water supply to be fed through the shaft from a suitable supply pipe indicated at 24, openings being provided through the shaft to the interior of the collar 22 which is hollow and by which the water is enabled to pass to all of the spray pipes. Each branch pipe 21 is provided with a valve indicated at 25, which is preferably a spring seated valve of the plunger type designed to be normally closed at all times except when the corresponding screen portion is in a position to receive the spray of water. At this time the stem of the plunger valve is designed to come in contact with a stationary cam surface 26 which presses the valve stem in and admits the water to the spray pipe, the cam surface being elongated sufficiently to keep the valve open until the screen surface has been thoroughly sprayed. In order to prevent the pipes from being clogged by the undersize material, I provide in proximity to each pipe a shield or protector 27, which is pivotally mounted between the side plates 16 and is maintained by counterweights 28 constantly directly over the spray pipes. Thus the pipes which are beneath the screen sections at the top of the drum are protected from the falling material while the openings in the pipes above the screens at the bottom of the drum are unobstructed and free to discharge the wash water directly against the surface of the screens.

I prefer to support the shaft entirely from one side of the screen, as in this manner I leave the central portion of the opposite side entirely unobstructed for the delivery of the undersize material. To this end the hollow shaft projects only from one side of the screen drum and casing where it is journaled in the bearings 29, 29 between which the gear wheel 30 is located which receives its power from a smaller gear 31 on a counter-shaft 32 carrying fast and loose pulleys 33 and 34.

The screen surfaces 12 consist of woven wire of the proper mesh or size or any other form of screen carried by frames 12$^a$ which rest against the ledges or flanges formed by the angle bars 35 which latter are riveted to the inner faces of the side plates and to the edges of the radial partitions.

Over the meeting or abutting edges of the frames are placed angle bars 36 which are held in place by wedges or keys 37 driven in between the angle bars near their ends and lugs or projections 38 on the inner faces of the side plates. By this means the frames are firmly and securely held and yet may be readily removed for repairs, and as readily replaced.

Instead of having a plurality of valves, operated at the proper time by a cam surface, I may provide a single valve construction for accomplishing the same purpose, as shown in detail in Figs. 5, 6 and 7. In this construction, the spray water pipe 24, is led to the strainer box 38 made integral with the outer screen shaft bearing 29$^a$, a stuffing box 29$^b$, being provided to prevent leakage. From this strainer box the water passes through the hollow center of the screen shaft around the solid central bar 39, the left-hand end of which is of non-rotatable casting.

The right-hand end of the hollow shaft communicates with the valve box 40 carried by the screen block, from which the pipes 21$^a$ radiate and connect with the several spray pipes in the same manner as hereinbefore described. Within the valve box is located a valve block 41 detachably held in place by screws or other convenient fastening means, which block has ports 42 leading from the ends of the pipes 21$^a$ to the left-hand face of the block, see Fig. 6. A valve plate 43 is non-rotatably carried by the inner end of the rod 39, and has its face fitting snugly against the face of the valve block. This valve plate is provided with an arc-shaped port 44, and it will be seen that as the drum rotates carrying with it the valve block, the passages 42 are brought successively into communication with the elongated arc-shaped port 44, and thus the pipes are placed successively in communication. In this construction we prefer to place the fast and loose pulleys 33$^a$ and 34$^a$ on the screen shaft, as shown, and connect them to the drum by a double reducing gear, as shown.

Having thus described my invention, what I claim is:—

1. A rotary screen comprising a conical center in the shape of a truncated cone, side plates constituting heads, radial partitions joining said cone and side plates and providing compartments, screen frames covering said compartments, a supporting shaft projecting from the larger end of the conical center, the side plate at the opposite end having a delivery opening for each compartment, a spray pipe within each compartment for directing a spray of water toward the screen surface, and means for successively admitting water to said pipes, and cutting it off therefrom as the screen rotates, substantially as described.

2. A rotary screen drum having a plurality of compartments with inclined bottoms having delivery openings at one side, a supporting shaft suitably journaled and projecting from the opposite side, and hollow throughout part of its length, a spray pipe within each compartment for directing a spray against the surface of the screen, said pipes being in communication with said hollow shaft, means for automatically controlling said communication as the drum rotates, and a water supply pipe connected with said hollow shaft, substantially as described.

3. In combination a suitable casing, a screen drum rotatably mounted therein, means for feeding ore onto the exterior of said drum at the upper side, means for effecting the delivery of the under size material from the interior of the drum, a plurality of water spray pipes within said drum and carried thereby, and means for successively admitting water to said pipes and cutting it off therefrom as the drum rotates, substantially as described.

4. In combination, a suitable casing, a screen drum rotatably mounted therein, means for feeding the material to be separated onto the upper side of said drum, means for effecting the delivery of the under-sized material from the interior of the drum, a plurality of spray pipes within the drum and carried thereby having spray openings facing the inside of the screen surface, means for automatically controlling the flow of water to the pipes as the drum rotates, and means for protecting the pipes from under sized material when water is not flowing therethrough, substantially as described.

5. In combination, a suitable casing, a screen drum, rotatably mounted therein, means for feeding the material to be separated onto the upper side of said drum, means for effecting the delivery of the undersized material from the interior of the drum, a plurality of spray pipes within the drum and carried thereby having spray openings facing the inside of the screen surface, means for automatically controlling the flow of water to the pipes as the drum rotates, a protecting shield located in proximity to each pipe, and a counterweight for holding said shield at all times vertically over said pipe, substantially as described.

6. In combination, a screen drum, a plurality of spray pipes, a rotary box with which said pipes communicate, a valve block within the box having a plurality of passages in communication with said spray pipes, a non-rotatable valve plate having an elongated port coöperating successively with said passages, and means for admitting water to the valve box, substantially as described.

In testimony whereof, I affix my signature in presence of two witnesses.

SAMUEL W. TRAYLOR.

Witnesses:
 MYLES A. WALSH,
 B. W. TRAYLOR.